US012229134B2

(12) United States Patent
Gopal et al.

(10) Patent No.: US 12,229,134 B2
(45) Date of Patent: Feb. 18, 2025

(54) SYSTEM AND METHOD FOR EFFICIENT QUERY PROCESSING

(71) Applicant: International Business Machines Corporation, Armonk, NY (US)

(72) Inventors: Venkatesh S. Gopal, Overland Park, KS (US); Brajesh Pandey, Shrewsbury, MA (US); Nadiya Kochura, Bolton, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/307,935

(22) Filed: Apr. 27, 2023

(65) Prior Publication Data
US 2024/0362220 A1    Oct. 31, 2024

(51) Int. Cl.
G06F 16/24      (2019.01)
G06F 11/34      (2006.01)
G06F 16/22      (2019.01)
G06F 16/2453    (2019.01)
G06F 16/27      (2019.01)

(52) U.S. Cl.
CPC .... *G06F 16/24542* (2019.01); *G06F 11/3409* (2013.01); *G06F 16/2282* (2019.01); *G06F 16/278* (2019.01)

(58) Field of Classification Search
CPC ........... G06F 16/24542; G06F 16/2282; G06F 16/278; G06F 11/3409
USPC ........................................................ 707/718
See application file for complete search history.

(56) References Cited

U.S. PATENT DOCUMENTS

| | | | |
|---|---|---|---|
| 5,909,681 A | 6/1999 | Passera et al. | |
| 10,356,150 B1 | 7/2019 | Meyers | |
| 10,692,015 B2 | 6/2020 | Xu et al. | |
| 11,563,803 B1 * | 1/2023 | Idreos | G06F 3/0604 |
| 2009/0024572 A1 * | 1/2009 | Mehta | G06F 16/24542 |
| 2010/0106934 A1 | 4/2010 | Calder et al. | |

(Continued)

FOREIGN PATENT DOCUMENTS

CN    107194001 B    11/2019

OTHER PUBLICATIONS

Nino Arsov et al., "Prediction of Horizontal Data Partitioning Through Query Execution Cost Estimation," arXiv.org, Dated: Nov. 26, 2019, pp. 1-2.

(Continued)

*Primary Examiner* — Hanh B Thai
(74) *Attorney, Agent, or Firm* — Patterson + Sheridan, LLP

(57) ABSTRACT

Method and apparatus for optimized data partition selection for related queries. A query to be executed over a plurality of data records is received. The plurality of data records comprises a first set of data records stored in a first database distributed across a plurality of partitions and a second set of data records stored in a second database. An input vector is generated based on the query, the first and second databases. The input vector is processed using a machine learning (ML) model to predict a cost for executing the query if one or more data records in the second set of data records are loaded to a first partition of the first database. A plan is selected for loading the one or more data records from the second set of data records to the first partition based on the predicted cost for executing the query.

25 Claims, 9 Drawing Sheets

(56) References Cited

U.S. PATENT DOCUMENTS

| | | | |
|---|---|---|---|
| 2013/0226903 A1* | 8/2013 | Wu | G06F 16/24549 707/719 |
| 2022/0019586 A1 | 1/2022 | Wang | |
| 2022/0067046 A1 | 3/2022 | Katroulis | |
| 2022/0075793 A1* | 3/2022 | Jezewski | G06N 5/04 |
| 2022/0284023 A1 | 9/2022 | Li et al. | |
| 2023/0273925 A1* | 8/2023 | Li | G06F 11/3419 707/713 |

OTHER PUBLICATIONS

"Global Data Lake Market Size to Grow from USD 7.9 Billion in 2019 to USD 20.1 Billion in 2025 with a CAGR of 20.6%—ResearchAndMarkets.com," Businesswire, Dated: Jan. 17, 2020, pp. 1-5.

"Configurations," Apache Parquet, Last Modified Mar. 24, 2022, pp. 1-1 https://parquet.apache.org/docs/file-format/configurations/.

IBM Documentation, "Explain," ibm.com, Last Updated: Mar. 31, 2021, pp. 1-4 https://www.ibm.com/docs/en/psfa/7.2.1?topic-reference-explain.

"File Format," Apache Parquet, Last Modified: Mar. 24, 2022, pp. 1-2 <https://parquet.apache.org/docs/file-format/>.

Krysztof Grajek, "Big Data and Parquet," SoftwareMill, Dated: Oct. 12, 2021, pp. 1-11.

"Data Lake Solutions," IBM.com, Date Accessed: Mar. 7, 2023, pp. 1-10 https://www.ibm.com/data-lake.

"Metadata," Parquet Apache, Dated Modified: Mar. 24, 2022, pp. 1-1 <https://parquet.apache.org/docs/file-format/metadata/>.

"What is Parquet?" Snowflake, Date Accessed: Mar. 7, 2023, pp. 1-7 https://www.snowflake.com/guides/what-parquet.

* cited by examiner

SYSTEM AND METHOD FOR EFFICIENT QUERY PROCESSING

BACKGROUND

The present disclosure relates to improved processing for database queries, and more specifically, to determining data placement to reduce query costs and data redistribution.

There are a wide variety of database architectures for processing and storing data in database systems, including various column-oriented formats and various row-oriented formats. Column-oriented format is a popular choice used in some open data storage formats, which have been developed for large-scale data processing and storage. Column-oriented formats generally store data organized in columns rather than rows, which may enable better compression, more efficient input/output (I/O) operations, and/or faster query performance for analytical data workloads. Some examples of column-oriented formats include Apache Parquet and Apache ORC (Optimized Row Columnar). A database storing data in column-oriented format may also referred to as a column-oriented database.

Row-oriented formats are another method for processing and storing data in a database or file system, where data is arranged in rows, each of which contains the values for a single record, and fields from the same record are generally stored together. Row-oriented formats, in some circumstances, may not be as efficient for analytical processing and large-scale data processing scenarios as column-oriented formats, which enable better compression and faster query performance.

In some cases, databases may be distributed across multiple repositories, nodes, or other partitions. When data is distributed in this way, query execution may include transferring data between such partitions. Further, when databases having differing architectures or formats are used in an analytics context (e.g., a query spanning over both architectures), computing costs may be incurred to collocate data from the two formats in order to efficiently execute the query. For example, a data warehouse with a row-oriented database may receive a query that spans both original data stored in the warehouse and data stored in one or more external sources (e.g., stored in an open data format in a data lake).

The present disclosure relates to determining or selecting data placement decisions to reduce query costs and data redistribution.

SUMMARY

One embodiment presented in this disclosure provides a method, including receiving a query to be executed over a plurality of data records, where the plurality of data records comprises a first set of data records stored in a first database distributed across a plurality of partitions and a second set of data records stored in a second database, generating an input vector based at least in part on values for a plurality of features based on the query, the first database, and the second database, processing the input vector using a machine learning (ML) model to predict a cost for executing the query if one or more data records in the second set of data records are loaded to a first partition of the plurality of partitions of the first database, and selecting a plan for loading the one or more data records from the second set of data records to the first partition based on the predicted cost for executing the query. One advantage provided by such an embodiment is more efficient query execution.

In another embodiment, one or more of the following features may be included. The method may further include generating a predicted query cost vector for the query by processing the input vector using the ML model, where the predicted query cost vector comprises a plurality of predicted query costs, and each respective predicted query cost of the plurality of predicted query costs corresponds to a respective data partition to which the one or more data records in the second set of data records can be loaded during execution of the query. When selecting the plan for loading the one or more data records, the method may further comprise identifying the first partition having a minimum query cost of the plurality of predicted query costs. One advantage of such an embodiment is identifying the data partition with the minimum query cost.

In another embodiment, one or more of the following features may be included. The method may further include training the ML model to predict the cost of the query. The training process may comprises accessing a plurality of training data records from historical information of the first and second database, wherein the plurality of training data records comprise one or more training queries, and one or more historical query costs, extracting a plurality of training features from the plurality of training data records, training the ML model by using the plurality of training features as inputs and the historical query costs as target outputs, and upon determining that accuracy of the machine learning model satisfies one or more accuracy criteria, deploying the machine learning model. One advantage provided by such an embodiment is obtaining more accurate ML models to predict the cost of a received query.

Other embodiments in this disclosure provide non-transitory computer-readable mediums containing computer program code that, when executed by operation of one or more computer processors, performs operations in accordance with one or more of the above methods, as well as systems comprising one or more computer processors and one or more memories containing one or more programs which, when executed by the one or more computer processors, performs an operation in accordance with one or more of the above methods.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments herein describes machine learning models that are trained and/or used to predict query execution cost based on data loading/placement decisions. For example, the machine learning model(s) may be used when received queries are executed against two databases, where at least one of the databases is partitioned across one or more data slices/data partitions in storage repositories. In some embodiments, execution of such queries may involve transferring or loading data from one database onto one or more data slices/data partitions of the other (e.g., loading data to the storage repositories where one or more data slices/data partitions are stored). In some embodiments, machine learning models can be trained using inputs to predict the query execution cost of a given query, depending on which partition is selected to load the data. The inputs may include, for example, characteristics of the given query, characteristics of the data stored in the external data repository, statistics or characteristics of the available data slices/data partitions in the storage repository, characteristics of one or more databases, and the like.

Figure 1:
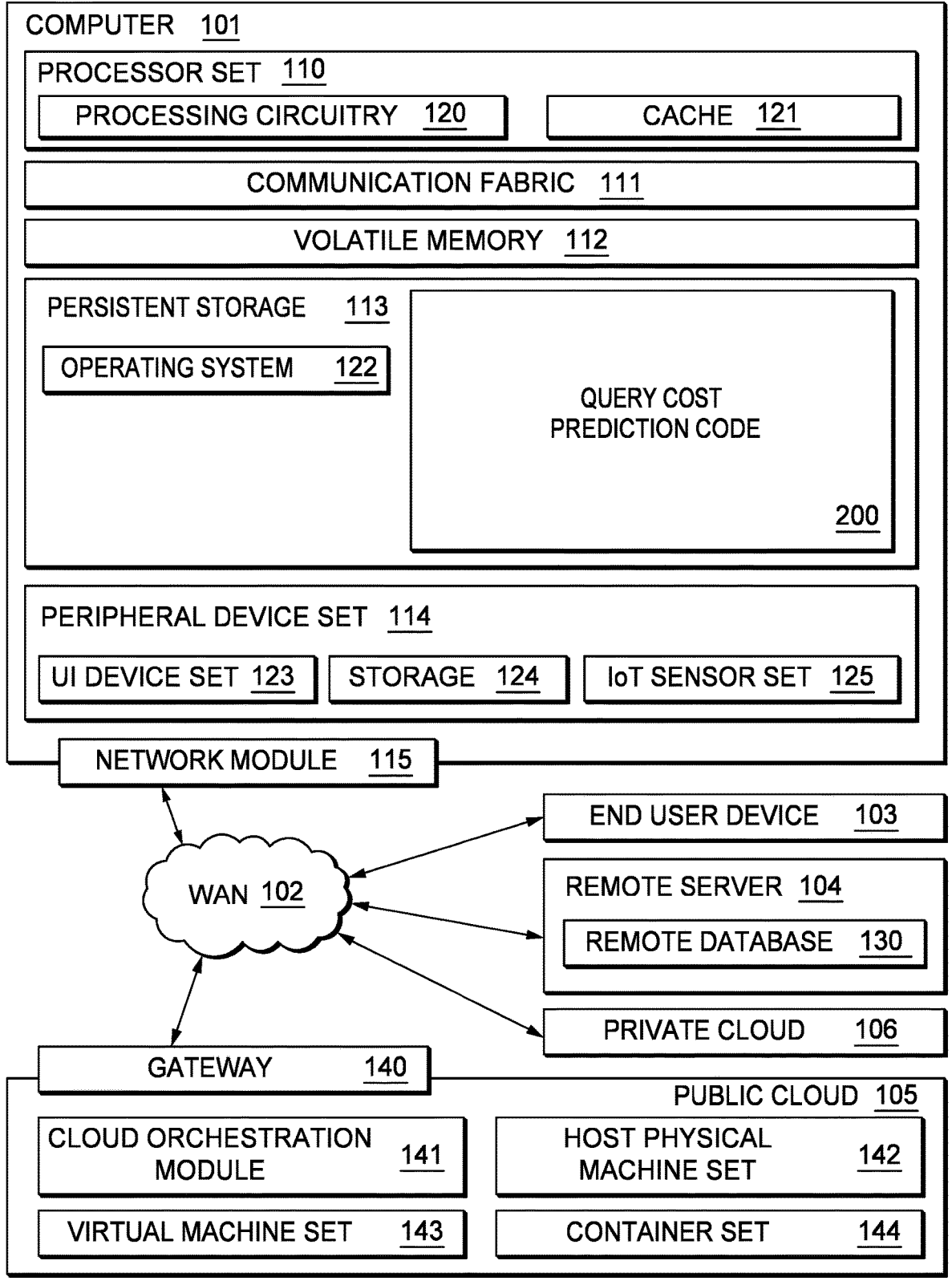
FIG. 1 depicts an example computing environment for the execution of at least some of the computer code involved in performing the inventive methods.

FIG. 1 depicts an example computing environment 100 for the execution of at least some of the computer code involved in performing the inventive methods.

Computing environment 100 contains an example of an environment for the execution of at least some of the computer code involved in performing the inventive methods, such as Query Cost Prediction Code 200. In addition to Query Cost Prediction Code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and Query Cost Prediction Code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in Query Cost Prediction Code 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in Query Cost Prediction Code 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105.

The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
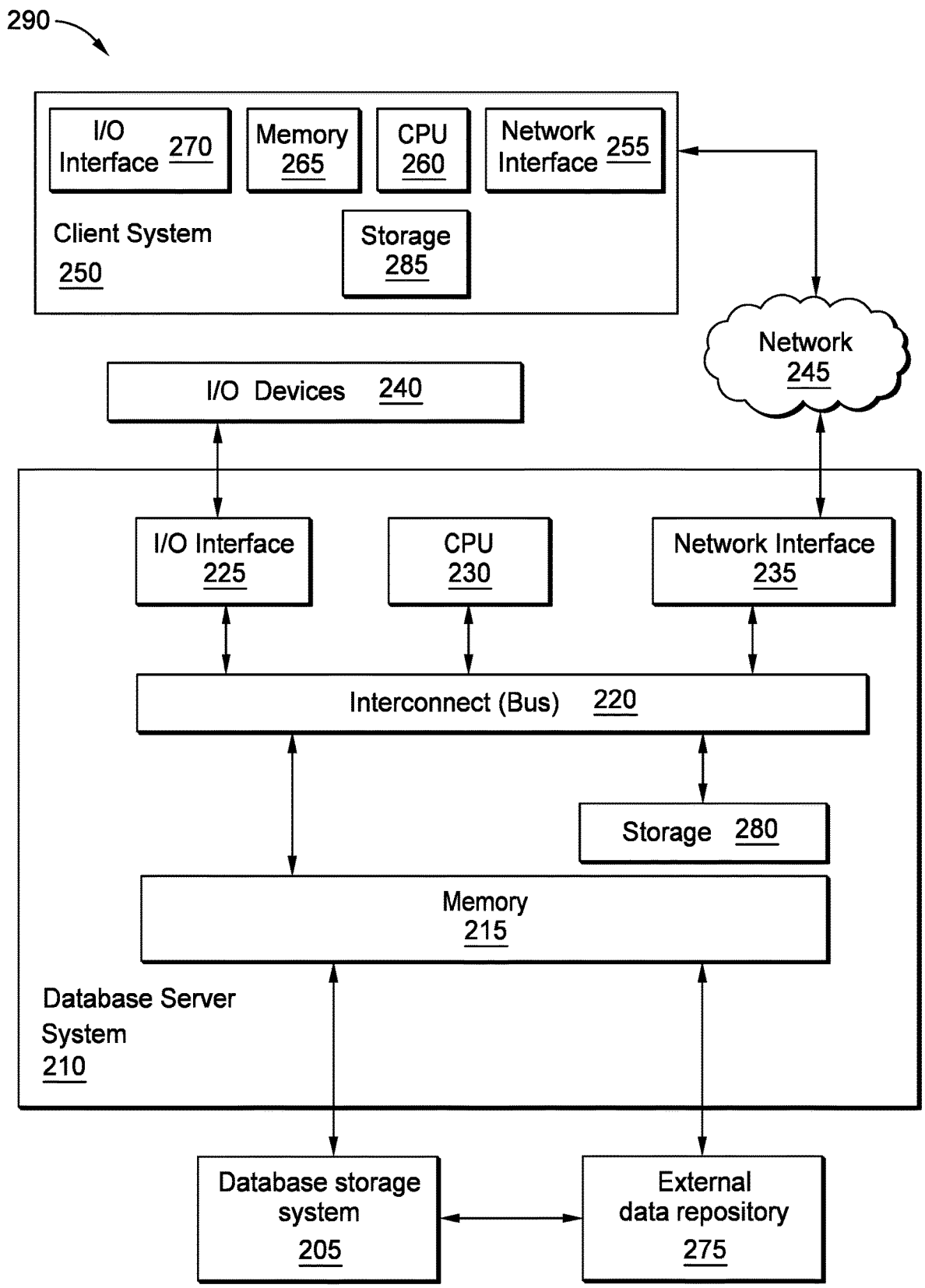
FIG. 2 depicts an example computing system for executing a query over a database, according to some embodiments of the present disclosure.

FIG. 2 depicts an example computing system configured to perform various aspects of the present disclosure, according to some embodiments of the present disclosure. As shown, the computing system 290 comprises one or more client systems 250 (also referred to in some aspects as end-user systems), one or more database server systems 210, one or more database storage systems 205, and one or more external data repositories 275. In some embodiments, each of the illustrated systems may be a physical device or system. In other embodiments, the illustrated systems may be implemented using virtual devices, and/or across a number of devices.

In the illustrated example, the database server system 210, database storage system 205, client system 250, and external data repository 275 are remote from each other and communicatively coupled to each other via a network 245. That is, the database server system 210, database storage system 205, client system 250, and external data repository 275 may each be implemented using discrete hardware systems. The network 245 may include or correspond to a wide area network (WAN), a local area network (LAN), the Internet, an intranet, or any combination of suitable communication medium that may be available, and may include wired, wireless, or a combination of wired and wireless links. In some embodiments, the database server system 2210, database storage system 205, client system 250, and external data repository 275 may be local to each other (e.g., within the same local network and/or the same hardware system), and communicate with one another using any appropriate local communication medium, such as a local area network (LAN) (including a wireless local area network (WLAN)), hardwire, wireless link, or intranet, etc.

As illustrated, the database server systems 2210 include a CPU 230, a memory 215, one or more storages 280, one or more network interfaces 235, and one or more I/O interfaces 225. In the illustrated embodiment, the CPU 230 retrieves and executes programming instructions stored in memory 215, as well as stores and retrieves application data residing in storage 280 and the database storage system 205. The CPU 230 is generally representative of a single CPU and/or GPU, multiple CPUs and/or GPUs, a single CPU and/or GPU having multiple processing cores, and the like. The memory 215 may include random access memory (RAM) and/or cache, and may include control logic (e.g., computer software) and/or data.

In some embodiments, I/O devices 240 (such as keyboards, monitors, etc.) are connected via the I/O interfaces 225. Further, via the network interface 235, the database server systems 210 can be communicatively coupled with one or more other devices and components (e.g., via a network, which may include the Internet, local network(s), and the like). As illustrated, the CPU 230, memory 215, network interfaces 235, and I/O interfaces 225 are communicatively coupled to each other via one or more interconnects or buses 220.

The client system 250 enables users and/or applications to communicate with the database server system 210 (e.g., via network 245). The client system can be any type of computing device that can receive commands or queries from users or applications and transmit the received commands or queries to the database server system 210. In some embodiments, the client system can correspond to conventional computing devices such as laptops, desktops, tablets, and smartphones, as well as a growing number of Internet of Things (IoT) devices such as smart home devices, fitness trackers, and industrial sensors, etc. As illustrated, the client system 250 includes a CPU 260, a memory 265, a storage 285, one or more network interfaces 256, and one or more I/O interfaces 270. In the illustrated embodiment, the CPU 260 retrieves and executes programming instructions stored in memory 265, as well as stores and retrieves application data residing in storage 285.

Database storage system 205 generally stores data (e.g., table data, system data, statistics that describe table data, etc.). In some embodiments, database storage system 205 may be implemented using any suitable storage device, including any computer readable storage media. External data repository 275 is communicatively coupled to database storage system 205 and/or the database server system 210 and similarly stores various data. In one embodiment, the external data repository 275 may correspond to a data lake that allows users to store, manage, and analyze (potentially) large volumes of structured and/or unstructured data in its raw, native format. In other embodiments, the external data repository 275 may refer to traditional database that enforces a pre-defined schema when storing data.

In one embodiment, the combination of the database server system 210 and the database storage system 205 may correspond to a data warehousing and analytics appliance (e.g., Netezza) for query processing, where the database server system 210 may correspond to a Symmetric Multiprocessing (SMP) front end, and the database storage system may correspond to a massively parallel processing (MPP) back end.

In some aspects, database storage system 205 corresponds to a partitioned database (e.g., one with slices or portions stored in different logical or physical partitions or repositories, such as on different storage hardware). In some aspects, when a query (such as one received from the client system 250) spanning both data stored in the database storage system 205 and data stored in one or more external data repositories 275 is received, the database server system 210 may load relevant data from external data repositories 275 to one or more partitions/slices on database storage system 205 (by transferring or causing the relevant data to be transferred directly, and/or by retrieving it from external data repositories 275 and loading it into the database storage system 205) as part of executing the query.

In some aspects, the specific partition selected to load data (from external data repository 275) may affect the execution/computation costs of the query (e.g., latency, memory footprint, processing time, energy consumed, and the like). For example, in some embodiments, redistribution of the data (from external data repository 275) across available data slices/partitions may be performed, in order to create a joined table where the distribution of data (from external data repository 275) is collocated with the distribution of the local data in the database server system 210. The redistribution operations may negatively impact (e.g., increase) the execution/computation costs of the query, especially when a large volume of data is involved.

In some embodiments, the database server system 210 may train and/or use one or more machine learning models to predict the query execution costs for one or more data slices/partitions in the database storage system 205 when executing the new query, based on characteristics of the given query, characteristics of the data stored in the external data repository 275, statistics or characteristics of the available data slices/data partitions in the database storage system 205, characteristics of the two databases, and the like. In some embodiments, the database server system 210 may identify or select a data slice/data partition or a combination of data slices/data partitions with the lowest/minimum query cost to store the data (from external data repository 275). In some embodiments, the trained machine learning models are stored in the storage 280, as discussed in more detail below. In some embodiments, the trained machine learning models are loaded to the memory 215 and performed by a Database Management System (DBMS) component to predict query cost, as discussed in more details below.

Figure 3:
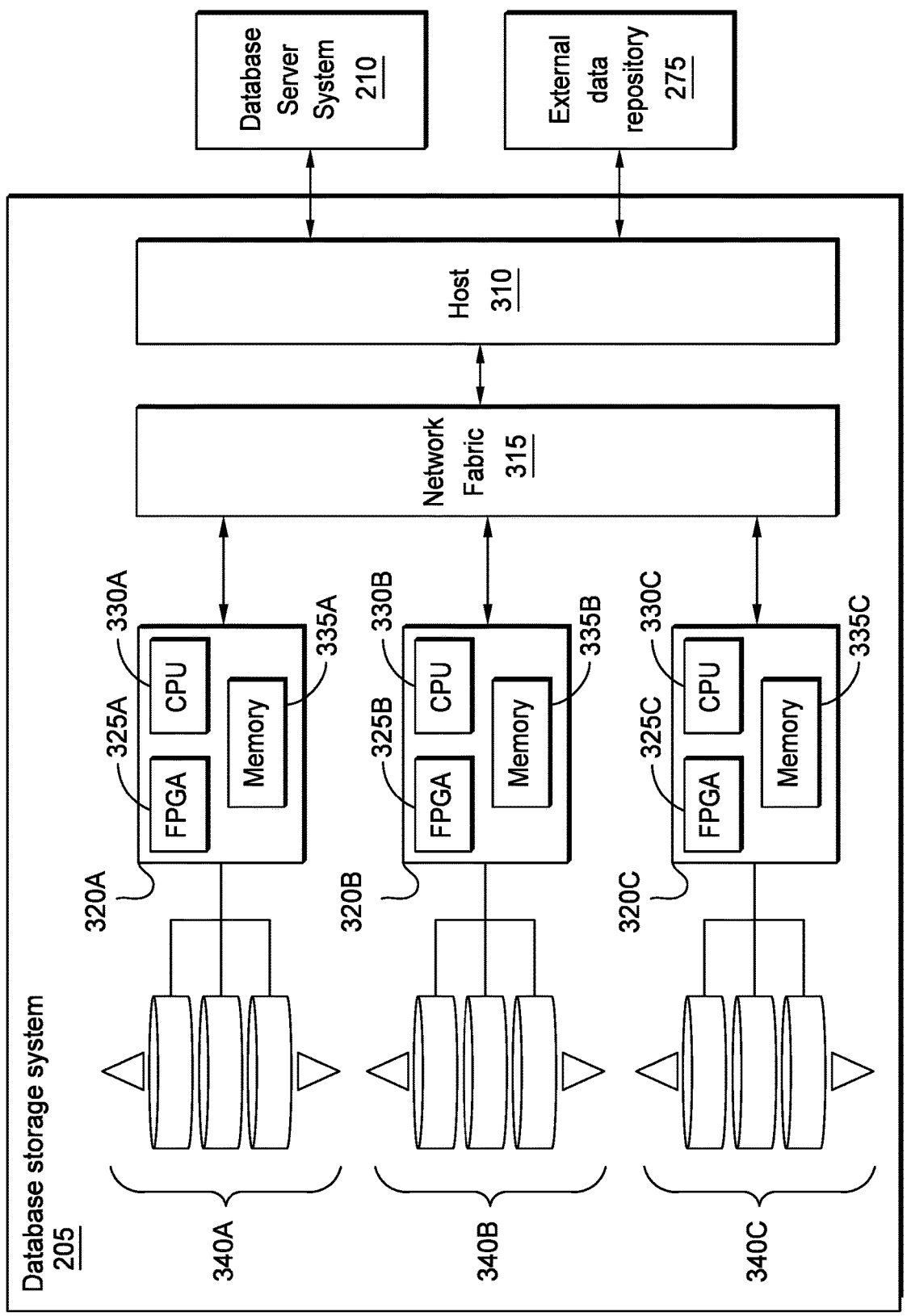
FIG. 3 depicts an example storage system in a database, according to some embodiments of the present disclosure.

FIG. 3 depicts an example database storage system in a database, according to some embodiments of the present disclosure. In the illustrated example, the database storage system 305 is built upon MPP architecture, where the system divides the processing workload across multiple independent nodes, and each node has its own processor, memory, and storage. In the illustrated example, the database storage system 205 comprises one or more hosts 310, a network fabric 315, and one or more information processing nodes (e.g., 320A-320C), and one or more data partitions (e.g., 340A-340C) (also referred to in some embodiments as data slices) for each information process node. The hosts 310 are communicably coupled to the database server system 210 via a network, and may receive requests from, and provide responses to, the database server system 210 for processing queries received from client systems. The hosts 310 may also be communicably coupled to the external data repository 275 via a network, allowing the hosts 310 to load data from the external data repository 275 for query execution.

In some embodiments, the hosts 310 may be high-performance servers set up in an active-passive configuration for high availability. In some embodiments, the hosts 310 may present a standardized interface to the database server system 210, external data repository 275, and other external tools and applications. In some embodiments, the hosts 310 may compile queries into executable code segments (e.g., snippets), create an optimized query plan, and distribute the executable code segments to the information processing nodes (e.g., 320A-320C) for query execution.

As illustrated, each information processing node (e.g., 320A-320C) may be an independent server or other logical node, and may comprise one or more CPUs (e.g., 330A-330C), one or more FPGA processors (e.g., 325A-325C), and/or memory (e.g., 335A-335C). The memory (e.g., 335A-335C) may include random access memory (RAM) and/or cache. In some aspects, the CPUs and FPGA processors are designed to execute complex algorithms against large data volumes for advanced analytics application.

In some embodiments, the information processing nodes (e.g., 320A-320C) may correspond to snippet processing units (SPUs) (also referred to in some embodiments as s-blades) in a MPP-structured data warehousing and analytics appliance (e.g., Netezza). In some embodiments, when a user creates a table and loads data into the MPP-structured database storage system (e.g., Netezza), data for the table may be distributed across the available data partitions/data slices (e.g., 340A-340C) in the system, such as by using a distribution key. The distribution key may be a column or a set of columns specified in each node during table creation. In some embodiments, the distribution key may be used to ensure an even distribution of data across all available data slices/partitions (e.g., such that each data slice has approximately the same amount of data as the others). In some embodiments, the database storage system (e.g., Netezza) may use a hash-function to distribute the data based on the distribution key. For each row in a distributed table, the system may calculate the hash value of the distribution key and use the hash value to determine the appropriate data slice/data partition (e.g., 340A-340C) to store the row. By distributing the data based on the hash value, the system can ensure that the data is evenly spread across the available data slices/data partitions, minimizing the need for redistribution or data movement between data slices/data partitions during query execution. Various tools and methods may be used to load data into the database storage system 205.

In some aspects, when data is loaded from external data repository 275 during query execution, the database server system 210 may select one or more data slices/partitions (e.g., 340A-340C) into which the data (from external data repository 275) should be loaded. For example, a received query may span both local data stored in the database storage system 205 and data stored in one or more external data repositories 275. The original data may has been distributed across some of the available data slices/partitions (e.g., 340A-340C) in the database storage system 205. When a join or other operations are executed (as part of executing a given query), it may be beneficial to load the data (from external data repository 275) to the data slice(s)/partition(s) where the relevant local data is already stored. In some embodiments, machine learning models may be trained and/or used to predict the query execution costs for one or more data slices/partitions in the database storage system 205 when executing the new query. The machine learning models may take a variety of features as inputs, such as characteristics of the given query, characteristics of the data stored in the external data repository 275, statistics or characteristics of the available data slices/data partitions in the database storage system 205, characteristics of the two database, and the like.

Figure 4:
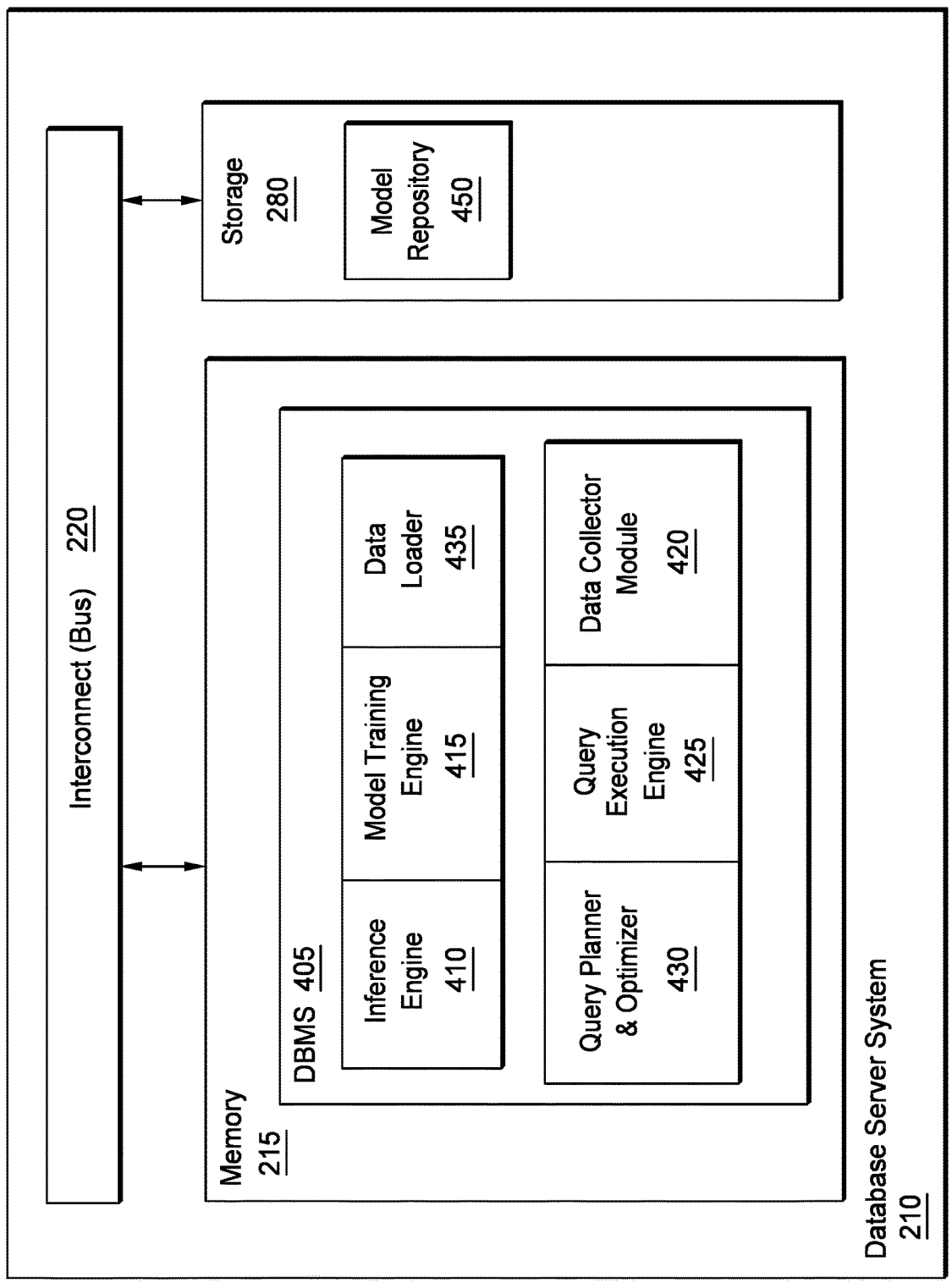
FIG. 4 depicts an example database management system (DBMS) in a database server system, according to some embodiments of the present disclosure.

FIG. 4 depicts an example database management system (DBMS) in a database server system, according to some embodiments of the present disclosure. As illustrated, the memory 215 of the database server system 210 includes a database management system (DBMS) 405 (e.g., row-oriented relational database management system (RDBMS), and/or column-oriented CDBMS, etc.). DBMS 405 provides access to data stored in the database storage system 205. The DBMS 405 may be implemented across one or more database server systems 210. In the illustrated embodiment, the DBMS 405 may include an inference engine 410, a model training engine 415, a data collector module 420, a query execution engine 425, a query planner & optimizer 430, and a data loader 435.

In the illustrated embodiment, the inference engine 410, the model training engine 415, the data collector module 420, the query execution engine 425, the query planner & optimizer 430, and the data loader 435 are communicatively coupled. Although depicted as discrete components for conceptual clarity, in some embodiments, the operations of the inference engine 410, the model training engine 415, the data collector module 420, the query execution engine 425, the query planner & optimizer 430, and the data loader 435 may be combined or divided across any number of components. In the illustrated embodiments, the model training and inference processes are depicted as being performed by the same system. In some embodiments, the model training process may be performed by one system, while the inference process may be performed by another system.

In some embodiments, the query planner & optimizer 430 may analyze queries received by the DBMS and generate a query plan. In some embodiments, query execution engine 425 may carry out the query plan, and may use worker units to perform operations on the query plan. In some embodiments, the query planner & optimizer 430 may perform data redistribution, such as when data is loaded from the external data repository 275 into the database storage system 205.

In some embodiments, the database server system 210 may receive a query to be executed over multiple databases (e.g., data stored in the database storage system 205 and data stored in the external data repository 275). To execute the query and perform related analysis, data (from the external data repository 275) may be loaded into the database storage system 205. In some aspects, the data in the database storage system 205 and the data loaded from the external data repository 275 may be structured or stored in different formats or architectures. For example, the data in the database storage system 205 may be structured in a row-oriented format, whereas the data in the external data repository 275 may be structured in a column-oriented format. In some embodiments, when the data from the external data repository 275 is loaded into the database storage system 205, one or more tables created for the data may not be collocated with tables created for the original data, causing data skews in the database storage system 205. In some such circumstances, query planner & optimizer 430 may redistribute or load the tables for the data across available data slices/data partitions, to balance the data distribution in the database storage system 205. The redistribution may increase the cost of executing a query, consequently reducing the overall system performance. In order to identify a more efficient data placement plan when reading the data from external repositories (e.g., to minimize data movement or redistribution when executing the query), in some embodiments, a machine learning model is trained to predict query cost when the query spans data stored in the database storage system 205 and data stored in the external data repository 275. At runtime, the trained machine learning model may be applied to predict the cost of a new, received query with respect to each relevant data slice/data partition to which data (from external data repository 275) relevant for the query may be loaded. Based on the predicted query costs, the system may identify or select a data slice/data partition or a combination of data slices/data partitions with the lowest/ minimum query cost to store the data.

In some embodiments, query cost may generally refer to the computing cost of executing a query. More specifically, query cost may refer to the computing efforts/resources required to process a received query, identify/read the relevant data from storage devices, load the data to memory, process the data based on the query's conditions, and return results back to the request devices. The query cost may be affected by various factors, including the complexity of the query, the size and distribution of the relevant data, the amount of memory available for the query, other hardware and network resources available to the system, etc.

In the illustrated example, the storage 280 also includes a model repository 450 to store machine learning models that have been trained to predict query costs, as discussed in more detail below. In some embodiments, the data collector module 320 may be integrated with the query execution engine 425, and may be configured to process training datasets (e.g., data extracted from historical data records and used to train a machine learning model) to collect information from various sources (such as those listed in Table 1 below in column "Sources"). In some embodiments, such information may be used as input features for the machine learning models.

For example, the features may include (without limitation) data statistics or characteristics for the data stored in the external data repository 275 (e.g., the metadata for column-oriented data and related table statistics), the available data slices/data partition statistics of a database storage system (e.g., of the database storage system 205), joined tables statistics and query plan data disclosed in query execution engine reports (e.g., actual query cost for executing a given query), and the like. In some embodiments, the data collector module 420 may also process newly queries received at runtime, and evaluate the data involved to execute the new query (e.g., a query spanning over data structured according to a first architecture and stored in the database storage system 205, as well as data structured according to a second architecture and stored in external data repository 275) to collect information from various sources, such as those listed in Table 1.

In some embodiments, the model training engine 415 may process and validate the information collected by the data collector module 420 to extract or generate values for a plurality of model features from the collected information, such as those listed in Table 1 in column "Features." In some embodiments, the model training engine 415 may use the extracted model features (e.g., RowGroup A min., RowGroup A max, RowGroup A size, RowGroup A cardinality, the range of RowGroup, number of rows in the table loaded from an external data repository, the minimum and maximum values of each column in the table, the number of unique or distinct values of each column, the number of NULLs in each column, etc.) and their corresponding values as inputs, and use the historical query costs as target outputs to train a machine learning model to predict the query costs for new queries. In some embodiments, the trained prediction query cost machine learning model may be validated and tested on one or more datasets to ensure that the model is sufficiently accurate and/or ready for deployment. The trained query cost prediction machine learning model may be stored in the model repository 450 in the storage 280 once the model is determined to be ready for deployment.

In some embodiments, the inference engine 410 may process the information collected by the data collector module 420 when a new query is received/processed at runtime, and may extract a plurality of model features from the collected information, such as those listed in Table 1 in column "Features" (except for the "query cost" feature, which is used as the target feature during training). In some embodiments, the inference engine 410 may download or access a trained query cost prediction machine learning model based at least in part on the profile of the new query from the model repository 450, and generate model input vector based on the plurality of extracted features and their corresponding values. That is, in some embodiments, a different model may be trained for each underlying architecture, and the inference engine 410 may select the appropriate model based on the query at runtime. For example, a first model may be trained to predict query costs for queries that span the database storage system 205 and a first external data repository 275 (structured according to a first architecture), a second model may be trained to predict query costs for queries that span the database storage system 205 and a second external data repository 275 (structured according to a second architecture), and the like.

The inference engine 410 may apply the generated model input vector for the new query to the prediction query cost machine learning model. That is, the inference engine 410 may process the input vector using the model to generate output. The output of the model may be a predicted query cost vector, which lists the predicted execution costs for one or more data slices/data partitions in the database storage system 205 when executing the new query. That is, the predicted cost vector may indicate, for each respective partition or data slice in the database storage system 205, the predicted execution cost of the query if data is loaded from the external data repository 275 into the respective partition or data slice. In some embodiments, the predicted query cost vector may be passed to the data loader 435 for further processing.

In some embodiments, the data loader 435 may analyze the predicted query cost vector received from the inference engine 410. As discussed above, the predicted query cost vector may list the predicted costs for each relevant data slice/data partition in the database storage system 205 when executing the new query. For example, the system may receive a new query to be executed over data stored in the database storage system 205 and data stored in the external data repository 275. In some embodiments, the predicted query cost vector may include a predicted cost for executing the new query when the relevant data from external data repository 275 is loaded to one or more specific data slices/data partitions in the database storage system 205. In some embodiments, the predicted query cost vector may include a plurality of the predicted costs for a given query, where each predicted cost corresponds to a data slice/data partition to which the relevant data (from external data repository 275) may be loaded during execution of the query. In some embodiments, the data loader may, based on the predicted query cost vector, decide, select, or generate an optimal plan for executing the query and/or for loading the data from external sources. In some embodiments, the data loader may select a data slice/data partition (or a combination of data slices/data partitions) having the lowest/minimum predicted query cost to load the data from external sources.

Figure 5:
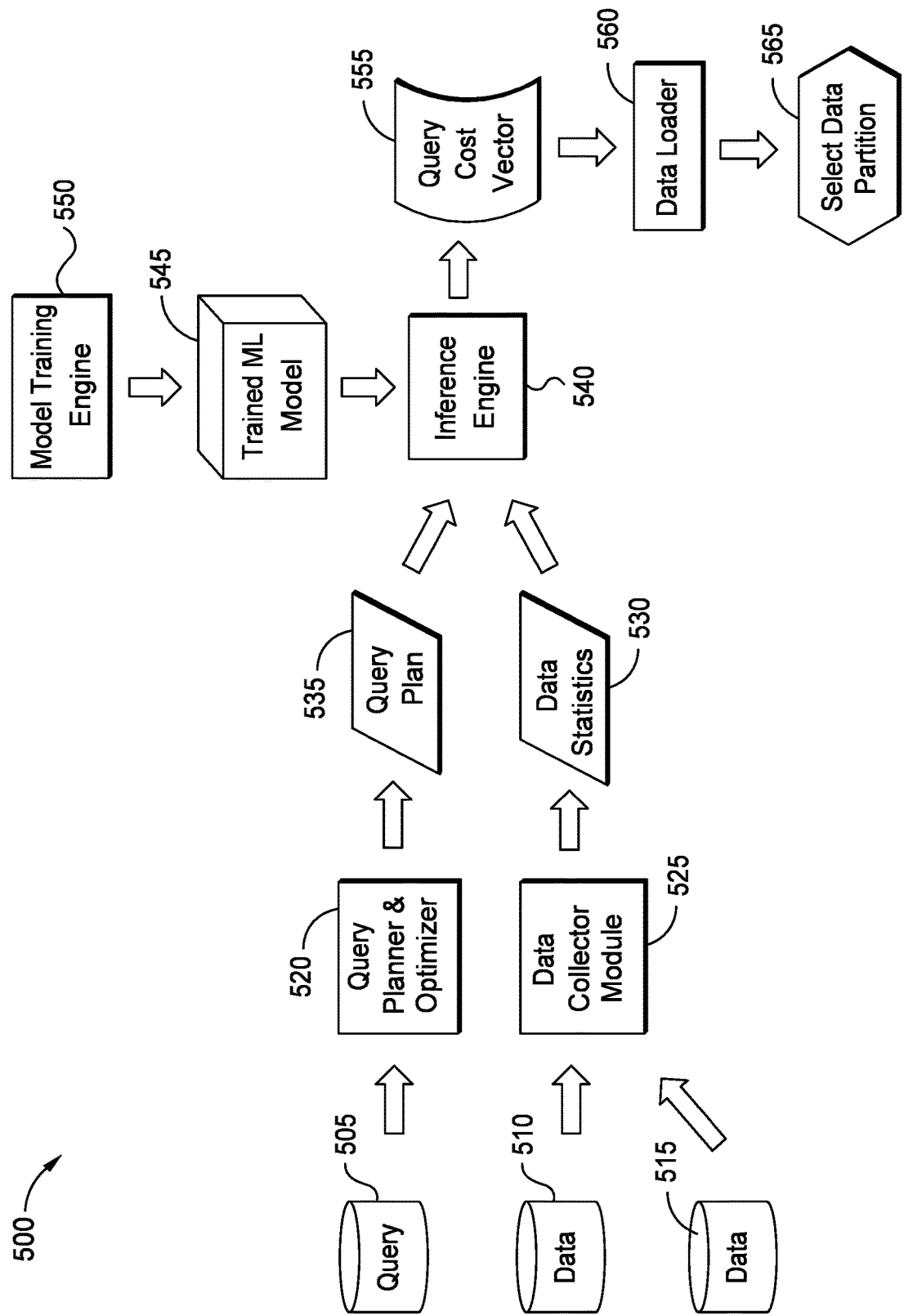
FIG. 5 depicts an example of workflow for improved data partition selection, according to some embodiments of the present disclosure

FIG. 5 depicts an example of workflow for improved data partition selection, according to some embodiments of the present disclosure. In some embodiments, the workflow 500 may be performed by a DBMS component, such as the DBMS 405 of FIG. 4. That is, some or all of the depicted components (e.g., the inference engine 410, model training engine 415, data collector module 420, query planner & optimizer 430, and/or data loader 435) may be components of the DBMS 405. Though depicted as discrete components for conceptual clarity, in some embodiments, the operations of the depicted components (and others not depicted) may be combined or distributed across any number and variety of components, and may be implemented using hardware, software, or a combination of hardware and software.

In the illustrated example, a query 505 received at runtime is processed by the query planner & optimizer 520 (which may correspond to 430 of FIG. 4) to generate a proposed query plan 535. The query plan 535 may include statistics or characteristics of the received query 505. The received query 505 may span over data stored in multiple databases/repositories, such as the data 510 stored in a database storage system (e.g., 205 of FIG. 2) and data 515 to be loaded from external sources (e.g., external data repository 275 of FIG. 2).

In the illustrated example, the data collector module 525 (which may correspond to 420 of FIG. 4) evaluates the data 510 and 515 to collect information from various sources (such as those listed in Table 1), and generates data statistics 530. In some embodiments, the data statistics may include one or more format statistics or characteristics for one or more database formats or architectures (e.g., the metadata for data 510 and 515 and related table statistics), statistics for available data slices/data partition (e.g., 340A-340C of FIG. 3) in a database storage system (e.g., 205 of FIG. 3), statistics for joined tables with data 510 and 515, and the like.

In the illustrated example, the inference engine 540 (which may correspond to 410 of FIG. 4) receives the query plan 535 and data statistics 530 from the query planner & optimizer 520 and data collector module 525. In some embodiments, the inference engine 540 may extract a plurality of features (such as those listed in Table 1) by processing these statistics, and converts the identified features and their corresponding values into an input vector. In some embodiments, the inference engine 540 may download or access trained query cost prediction machine learning model(s) 545, based at least in part on the profile of the received query 505 (e.g., selecting a model trained for the specific database architecture(s) queried by the query 505). The query cost prediction machine learning model(s) 545 may be trained by the model training engine 550 (which may correspond to 415 of FIG. 4).

In the illustrated example, the inference engine 540 applies the received query plan 535 and data statistics 530 to a trained query cost prediction machine learning model 545 to generate a predicted query cost vector 555. In some embodiments, the predicted query cost vector 555 may list the predicted cost for each relevant data slice/data partition (e.g., 340A-340C of FIG. 3) in the database storage system (e.g., 205 of FIG. 3) when executing the received query 505.

In the illustrated example, the predicted query cost vector 555 is accessed by the data loader 560 (which may correspond to 435 of FIG. 4). As discussed above, the predicted query cost vector 555 may include a plurality of the predicted costs for the received query 505, where each predicted cost corresponds to a data slice/data partition (e.g., 340A-340C of FIG. 3) in a database storage system (e.g., 205 of FIG. 3) to which the data 515 from external sources (e.g., external data repository 275 of FIG. 2) may be loaded during execution of the query 505. In the illustrated example, the data loader 560, based on the predicted query cost vector 555, selects one or more data slices/data partitions 565 for executing the query 505 and/or for loading the data 515 from external sources. In some embodiments, the data loader 560 may select a data slice/data partition 565 (or a combination of data slices/data partitions) having the lowest/minimum predicted query cost to load the data from external sources.

Figure 6:
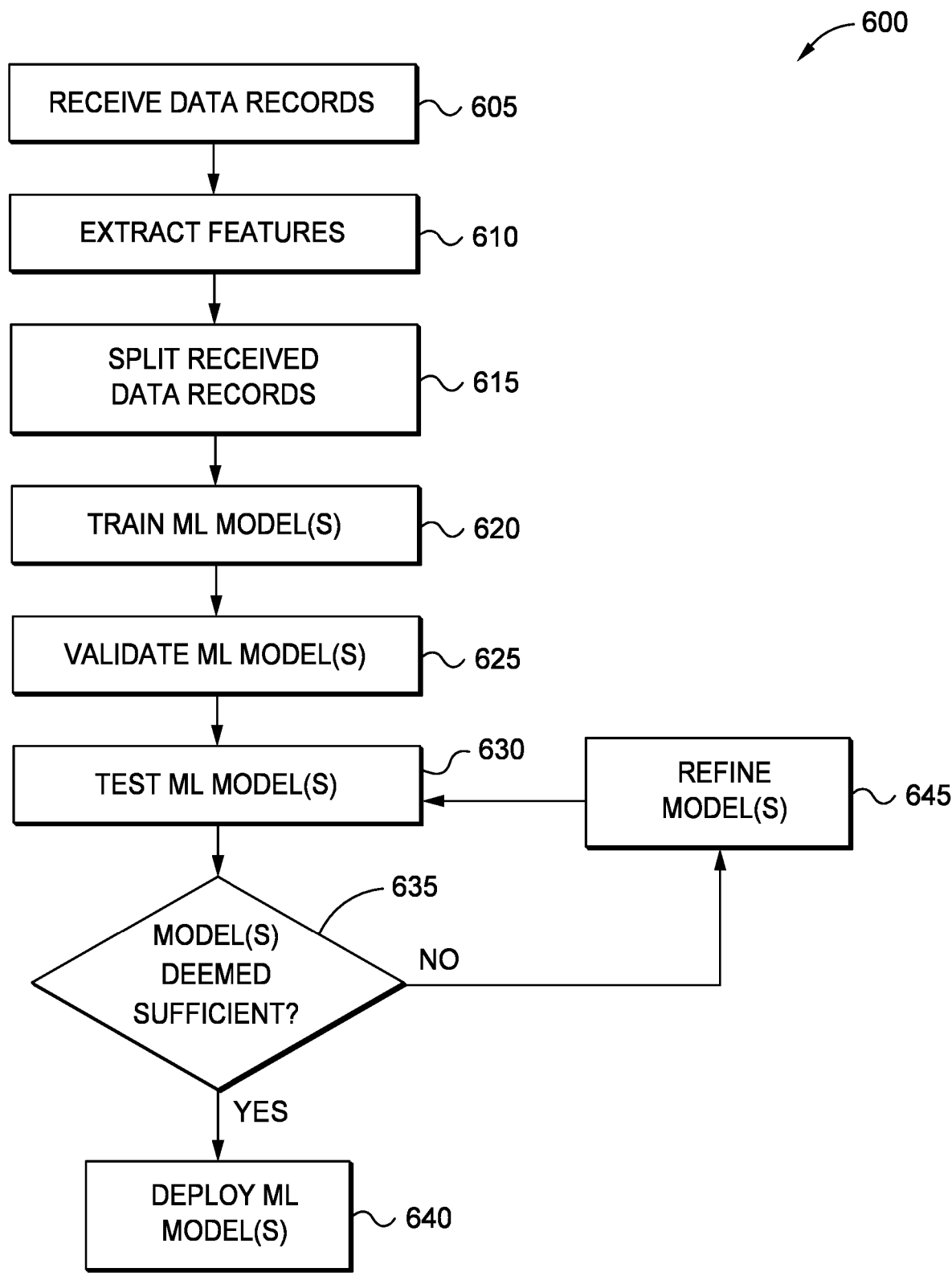
FIG. 6 depicts an example method of training, validating and testing machine learning models, according to some embodiments of the present disclosure.

FIG. 6 depicts an example method of training, validating, and testing machine learning (ML) models, according to some embodiments of the present disclosure. In some embodiments, the method 600 is performed by a model training engine (e.g., 415 of FIG. 4) in a database server system.

The method 600 begins at block 605, where a database server system accesses a set of data records during an initial training phase. Generally, "accessing" data may generally refer to "receiving," "retrieving," "requesting," "obtaining," or otherwise "gaining access to" the data.

The data records are received for training a machine learning model to predict query costs. Generally, the data records may have any number of attributes and may be accessed via any number of data sources, for example, the database storage system (e.g., 205 of FIG. 2) and the external data repository (e.g., 275 of FIG. 2). In some embodiments, each data record/data sample may comprise or correspond to a query that has been executed over data stored in the database storage system (e.g., 205 of FIG. 2) as well as data stored/loaded from external sources (e.g., 275 of FIG. 2). In some embodiments, each data record may be processed by a data collector module (e.g., 420 of FIG. 4) to collect information from various sources (such as those listed in Table 1), including but not limited to one or more format statistics or characteristics for one or more database formats or architectures (e.g., the metadata for column-based data and related table statistics), available data slices/data partition statistics, joined tables statistics, and query plan data disclosed in query execution engine reports (including actual query cost for executing a given query).

At block 610, the database server system extracts a plurality of features for each data record and identifies the corresponding value(s) for each feature. In some embodiments, the extracted feature refers to the model features used as input to the model, such as those listed in Table 1 in column "Features."

In Table 1, "RowGroup" refers to a logical horizontal partitioning of data into groups of rows, where a row group may consist of a column chunk for each column in the dataset; "RowGroup A. min" refers to the minimum value of a particular column (e.g., column A) within a RowGroup; "RowGroup A max" refers to the maximum value of a particular column (e.g., column A) within a RowGroup; "RowGroup A size" refers to the size or count of rows within a RowGroup; "RowGroup A cardinality (categorical data)" refers to the number of unique values in a categorical variable within a RowGroup. In Table 1, "ds. A min" refers to the minimum value of a particular column (e.g., column A) within a data slice; "ds. A max" refers to the maximum value of a particular column (e.g., column A) within a data slice; "ds. A size" refers to the size of a data slice; "ds. A cardinality" refers to the number of unique values in a categorical variable within a data slice.

In some embodiments, the values for each feature may be extracted from various sources, such as partitioning metadata, row data table, data slice statistics, joined table statistics, and query plan data. For example, in some embodiments, partitioning metadata may include values for various features, such as the minimum value within a horizontal data partition, the maximum value within a horizontal data partition, the size or count of rows within a horizontal data partition, the number of unique values in a categorical variable within a horizontal data partition, the range of values within a horizontal data partition, the mean, standard deviation (STD) and percentile of values within a horizontal partition, and the like. Raw data table statistics may include values for various features, such as the minimum and maximum values involved in one or more clauses in a query, the minimum and maximum values within a raw data table, the number of NULLs within a raw data table, the number of unique or distinct values within a raw data table, the number of rows within a raw data table, the number of columns within a raw data table, the size of each row, the number of extents in each table, and/or the total number of extents on a data slice. Data slice statistics may include values for various features, such as the minimum value of a data slice, the maximum value of a data slice, the size of a data slice, the number of unique values in a categorical variable within a data slice, the range of value within a data slice, the mean, standard deviation, and/or percentile of a data slice, the number of records stored on a data slice, and the minimum and maximum number of records within a data slice, the average records per data slice, and/or the standard deviation of records per data slice. Joined table statistics may include values for various features, such as the amount of disk space that is used for the table in a data slice, the length of a table row, the maximum and minimum size of data slices available to store the table, the ID of the largest data slice, and/or the space skew of data slices. Query plan data may include values for various features, such as the existence of distribution column, the characteristics of the query (distributed or broadcasted), and the query cost.

In some embodiments, the system may convert the extracted features and their corresponding values into a model input vector. The system may use the model input vector as input, where the model feature "query cost" and its corresponding value can be used as target output for each data record to train a machine learning model.

TABLE 1

| Source | Feature |
| --- | --- |
| Partitioning metadata | RowGroup A min |
| | RowGroup A max |
| | RowGroup A size, count |

TABLE 1-continued

| Source | Feature |
|---|---|
| Raw Data table statistics. | RowGroup A cardinality (categorical data)<br>Range = Maximum Value − Minimum Value<br>Mean, Standard deviation (STD), percentile (25%, 50%, 75%)(for numerical data)<br>Minimum and maximum values involved in the where clause or having clause of the query<br>The minimum and maximum values<br>The number of NULLs<br>The number of unique or distinct values<br>The number of rows<br>The number columns<br>Row size<br>The number of extents in each tables and the total number of extents on the data slice with the largest skew |
| Data slice statistics (for each data slice) | ds. A min<br>ds. A max<br>ds. A size<br>ds. A cardinality for categorical data<br>Range = Maximum Value − Minimum Value<br>Mean, Standard deviation (STD), percentile (25%, 50%, 75%)(for numerical data)<br>The number of records stored on each data slice<br>The minimum and the maximum number of records in data slice<br>The average records per data slice, and the standard deviation (population computation) |
| Joined table statistics | The amount of disk space that is used for this table in this data slice. The length of a table row.<br>Max/Min Space Per Data Slice: The disk space that is used by the largest data slice for the table in KB.<br>Max/Min Space Data Slice Id: The ID of the largest data slice.<br>Space Skew: The ratio that shows how disparate the data slice sizes are as calculated by (maximum data slice size − minimum data slice size)/average data slice size. |
| Query plan data | Distribution Column: yes/no<br>Distribute/broadcast: Is the system performing table broadcasts or distributes?<br>Query cost |

At block 615, the database server system can optionally split or delineate the accessed data records into three datasets/subsets, where the first set is used to train the ML model (referred as the "training dataset" in some embodiments), the second set is used to validate the ML model (referred as the "validating dataset" in some embodiments), and the third set is used to test the ML model (referred as the "testing dataset" in some embodiments).

At block 620, the database server system trains one or more machine learning model(s) to predict query costs when the query involves or spans data stored in the database storage system (e.g., 205 of FIG. 2) and data to be loaded from one or more external sources (e.g., 275 of FIG. 2). In some embodiments, the training process may be performed by the model training engine 415, illustrated in FIG. 4. A number of suitable machine learning algorithms or architectures can be used, depending on the particular implementation. In some embodiments, a decision tree architecture may be used. In some embodiments, a random forest architecture may be used, or any other suitable machine learning algorithm can be used. In some embodiments, a neural network architecture may be used for the machine learning model.

In some embodiments, once a type or architecture of model is selected, the system may initialize the model parameters and/or hyperparameters. The model parameters and/or hyperparameters specify and define the machine learning model and its behavior. For example, in some embodiments, if a neural network model is used, the neural network hyperparameters may be initialized by identifying or determining the number of layers, the number of nodes in each layer, the activation functions, batch size, and the like. In some embodiments, the model parameters (e.g., weights and/or biases) may be initialized randomly or with pre-trained values. After the initialization, the system may apply the training dataset to the model to predict query costs, and update the parameters based on the differences between the model outputs (e.g., predicted query costs) and target outputs (e.g., actual query costs indicated in query plans).

For example, the input features for a given training data record may be used as input to generate a predicted query cost vector, and this predicted cost may be compared against the actual or known historical cost of executing the query to generate a loss. This loss may then be used to refine the parameters of the model, such as via backpropagation. This process may be repeated one or more times (e.g., for a defined number of iterations or epochs) until the model has been trained. On example embodiment of the training process is discussed in more detail with reference to FIG. 8.

In some embodiments, the system may train machine learning models with different sets or combinations of hyperparameter values, and evaluate the performance of these models using the validating dataset, as discussed in more details below. In some embodiments, the system may randomly select a combination of hyperparameter values for each model from a predefined range. In other embodiments, the system may perform an exhaustive search to find all possible combinations of hyperparameter values from a predefined range.

At block 625, the database server system can optionally evaluate the performance of the trained machine learning model(s) using the validating dataset. For example, the system may process each record in the validating dataset using the trained machine learning model(s) to measure the performance of the model(s) from various aspects. In some embodiments, the system may use an evaluation metric to measure the performance of the model (the difference between model outputs and target outputs), such as means square error (MSE), mean absolute error (MAE), or R Squared, etc. In some embodiments, the system may train multiple models in parallel using the training dataset, where each model corresponds to a possible combination of hyperparameter values identified from the predefined range. Based on the performance of each model on the validating dataset, the system may select the model (the combination of hyperparameter values) that provides the best performance. Examples of hyperparameters include the learning rate, regularization parameter, number of hidden layers, number of neurons in each layer, etc.

At block 630, the database server system uses the testing dataset to determine the accuracy of the trained machine learning model (selected at block 625). The testing process is provided to access the model's performance on the testing dataset (e.g., which may correspond to new, unseen data that was not used during the training or validating processes), and to prevent the trained model from overfitting on the training and validating datasets. The model's performance may be determined by measuring the differences between the model outputs (e.g., predicted query costs) and target outputs (e.g., actual query costs indicated in query plans) on the testing datasets. In some embodiments, an evaluation metric may be used to measure the differences, such as MSE, MAE, or R Squared, etc. In some embodiments, the metric used in the testing process is same as that used in the validating process.

At block 635, the database server system decides whether the trained model is sufficiently accurate and/or ready for deployment, based on the model's performance on the testing dataset. In some embodiments, this may include determine whether the errors or differences between the model outputs (e.g., predicted query costs) and target outputs (e.g., actual query costs indicated in query plans) fall under one or more pre-defined criteria or thresholds. If the model is sufficiently accurate, the method 600 continues to block 640, where the database server system deploys the model for use at runtime. In some embodiments, the database server system may save the model in the model repository 350, as illustrated in FIG. 3. Returning to block 640, if the database server system determines the model is not sufficiently accurate, the method 600 proceeds to block 645, where the database server system further refines or tunes the model. In some embodiments, this may include applying additional training data records to refine the model.

Figure 7:
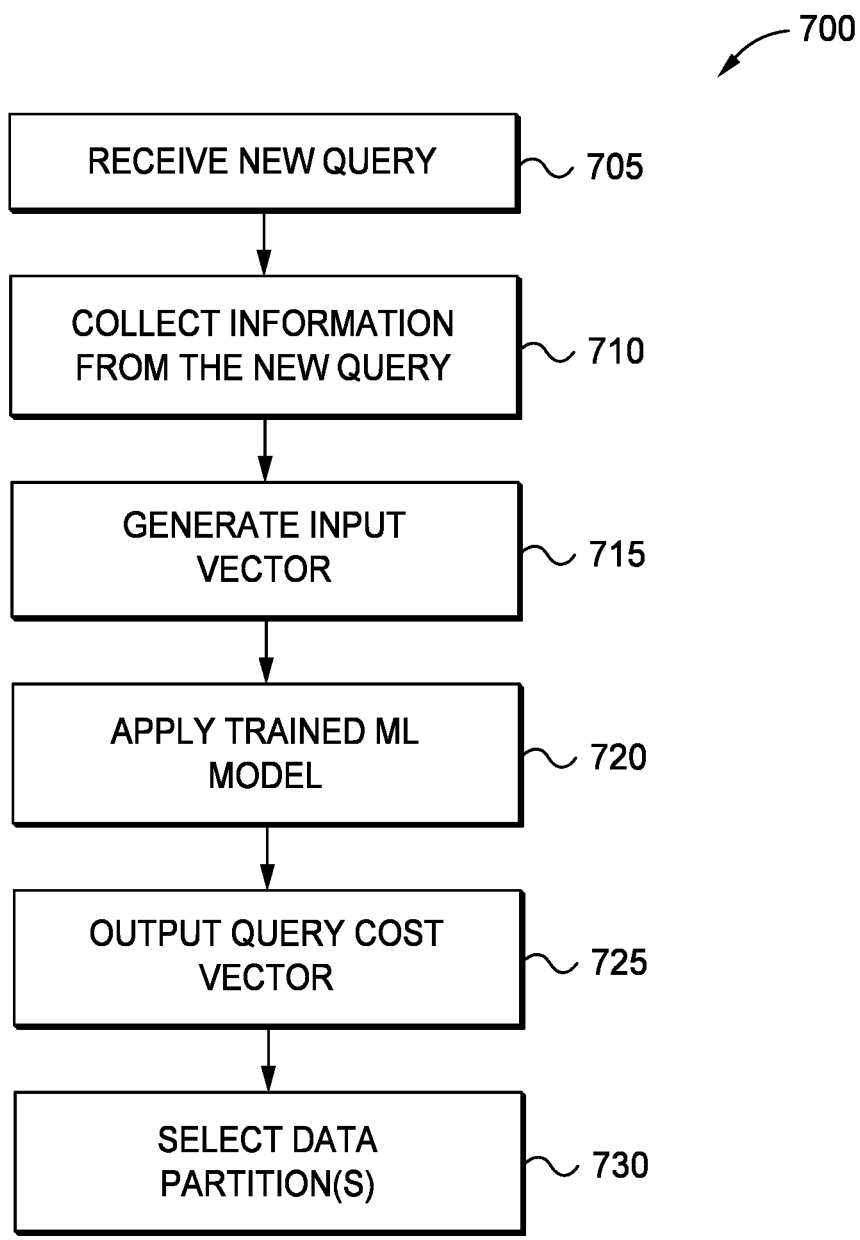
FIG. 7 depicts an example method for deploying trained machine learning models for improved data partition selection, according to some embodiments of the present disclosure.

FIG. 7 depicts an example method for using trained machine learning models for improved data partition selection, according to some embodiments of the present disclosure. In some embodiments, the method 700 may be performed by the inference engine 410 in a database server system, as illustrated in FIG. 4.

At block 705, a database server system receives a new query spanning over data stored in multiple databases/repositories, such as the database storage system (e.g., 205 of FIG. 2) and data to be loaded from external sources (e.g., 275 of FIG. 2). In some embodiments, the database storage system may store data according to one architecture or format (e.g., in a row-based format), and the external sources may store data according to a second architecture or format (e.g., in a column-based format). The method 700 then proceeds to block 710, where the database server system collects feature information for the new query, such as by determining the data necessary to execute the new query (including the data stored in the database storage system and data to be loaded from external sources) and/or data slice statistics in the database storage system. At block 715, the system extracts a plurality of features and their corresponding values from the collected information to generate an input vector for the query. At block 720, the system processes the input vector using a machine learning model that has been trained to predict query costs. In some embodiments, the machine learning model may be loaded from the model repository 450, as illustrated in FIG. 4. In some embodiments, the trained machine learning model may be a neural network model.

The method 700 then continues to block 725, where the machine learning model outputs a predicted query cost vector. In some embodiments, as discussed above, the predicted query cost vector may listing the predicted cost for each relevant data slice/data partition in the database storage system (e.g., 205 of FIG. 2) when executing the new query. For example, in some embodiments, the new query received at runtime may involve both data stored in the database storage system (e.g., 205 of FIG. 2) and data from external sources (e.g., external data repository 275 of FIG. 2). To generate a joined table with the data from each repository, the relevant data from the external source(s) may be loaded to the database storage system and distributed across the available data slices/data partitions in the system. The loading and redistribution may negatively impact (e.g., increase) the computing cost for executing the new query. The predicted query cost vector may therefore include a set of predicted costs for executing the new query, each of which corresponds to a data slice/data partition to which the relevant external data could be loaded during executing the query.

The method 700 then continues to block 730, where the system selects a data slice/data partition or a combination of data slices/data partitions that enables an optimal or more efficient performance when executing the received new query. In some embodiments, the system may select a data slice/data partition or a combination of data slices/data partitions with the lowest/minimum query cost. For example, in some embodiments, the received new query may be executed over both data stored in the database storage system (e.g., 205 of FIG. 2) and data from external sources (e.g., external data repository 275 of FIG. 2). The selected data slice/data partition or a combination of data slices/data partitions with the lowest/minimum query cost may then be used to store the column-oriented data loaded from external sources. In some embodiments, the selected data slice/data partition or a combination of data slices/data partitions ensures the minimum amount of data redistribution or data movement between slices when executing the new query. In some embodiments, the process at block 730 may be performed by the data loader 435 in the database server system, as illustrated in FIG. 4.

Figure 8:
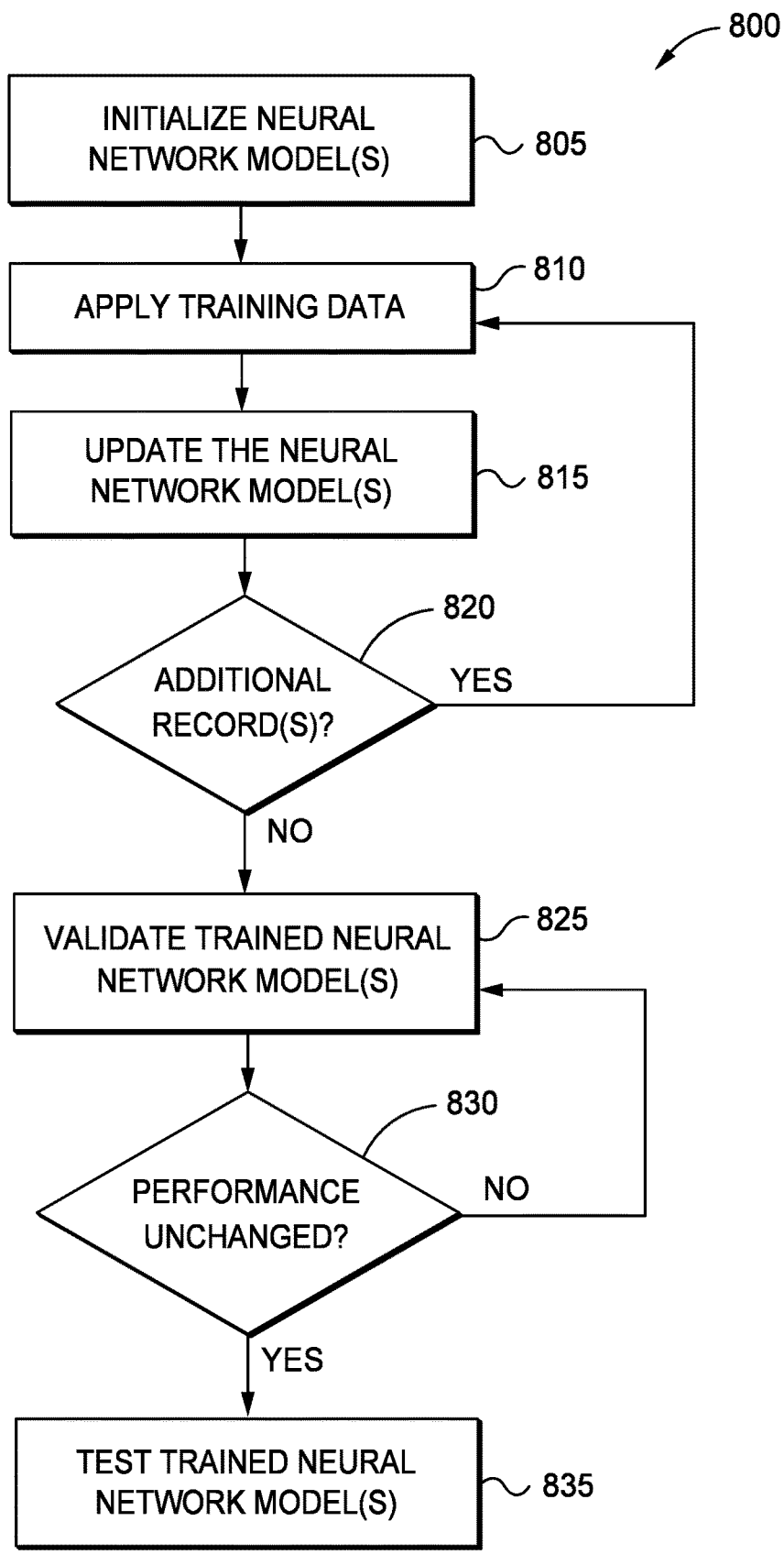
FIG. 8 depicts an example method of training, validating and testing neural network models, according to some embodiments of the present disclosure.

FIG. 8 depicts an example method of training, validating and testing a neural network model, according to some embodiments of the present disclosure. In some embodiments, the method 800 is performed by the model training engine 415 in the database server system 210, as illustrated in of FIG. 4.

In the illustrated example, neural networks are selected to train a machine learning model to predict query costs. The neural network model is trained through a supervised learning process, and comprises an input layer, one or more hidden layers and an output layer. The input layer consists of neurons or nodes that receive the input vectors/features from the training dataset, where the number of neurons or nodes in the input layer may correspond to the dimensionality of the training dataset. That is, in some embodiments, the number of neurons or nodes in the input layer may be equal to the number of extracted model features used by the model.

At block 805, a database server system initializes a neural network model based on the model's architecture/hyperparameters, such as the number of hidden layers, the number of nodes in each layer, the activation function(s) used, and the initial weights and biases, and the like. In some embodiments, the weights may be initialized with random values. In some embodiments, the weights may be initialized following Glorot or Xavier initialization when the Sigmoid or TanH activation function is used. In some embodiments, the weights may be initialized following He initialization when the rectifier liner (ReLU) activation function is used.

At block 810, the database server system applies one or more records from the training dataset (e.g., an input vector generated for the training record) to the neural network model to compute predicted query costs. In some embodiments, this process may be referred as the forward propagation. The input layer receives the input vector and passes/transforms it via one or more hidden layers until the data reaches the output layer to generate an output vector. The output vector comprises predicted query costs generated by the neural network model. In some embodiments, the output of each node in the output layer is generated by computing the weighted sum of the inputs plus a bias term, and applying the computed value to an activation function. The weights and biases of the neurons in each layer are trainable parameters of a neural network model and can be updated using back propagation.

At block 815, the database server system updates the weights and biases of the neural network model. The system first calculates the losses between the output vector (e.g., including predicted query cost for one or more training data records) and the target vector (e.g., including actual query cost for one or more training data records) using a loss function (e.g., mean squared error loss function, mean absolute percentage error loss function, etc.). Based on the loss function, the system computes the gradients of the loss function with respect to the weights and biases in each layer of the neural network model. The system then propagates the losses backwards through the network layers to fine-tune the weights and biases to minimize the losses. In some embodiments, optimization algorithms may be used to tune the weights and biases in the network. Examples of optimization algorithms include but not limited to batch gradient descent algorithm, stochastic gradient descent algorithm and mini-batch gradient descent algorithm. Using the optimization algorithm, the weights and biases of the model are adjusted iteratively in the direction of the steepest descent (or the negative gradient) until the loss function nears zero (e.g., point of convergence). The size of the steps that are taken to adjust weights and biases, in order to reach the minimum loss may be decided by a hyperparameter referred to as step size or learning rate. In some embodiments, a high learning rate may be set, resulting in more fast and efficient updates of the model. In some embodiments, a low learning rate may be set that leads to smaller and more gradual (even more precise) updates. However, the number of iterations may increase, and therefore reduce the overall efficiency of the system as it may take more time and computation to reach the minimum.

At block 820, the database server system determines whether there is at least one additional record in the received training dataset that has not yet been evaluated. If so, the method 800 returns to block 810. Otherwise, the method 800 continues to block 825. At block 825, the database server system validates the performance of the trained model on the validating dataset. The validating dataset comprises new and unseen data, and is different from the training dataset. In some embodiments, the validation process may be performed after each epoch for training a neural network is completed (e.g., the model has been trained through the entire received training data records). By doing so, the system can monitor the training progress and detect overfitting signs at an early stage. During the validation process, the system may tune the hyperparameters of the model to achieve optimal performance (e.g., selecting the model with a specific combination of hyperparamter values that provides the best performance on the validating dataset). Examples of hyperparameters of a neural network model include the number of neurons/nodes in the layer, number of predictors in the input data that is expected by the first layer, initial values for weights, the activation function for the calculations inside each neuron, batch size, the number of epochs, the number of hidden layers, etc.

The method 800 then continues to block 830, where the system determines whether the model's performance starts to degrade or remain unchanged (e.g., reach a plateau). If not, the method 800 returns to block 830. Alternatively, the method 800 continues to block 835, where the system evaluates the performance of the trained model on the testing dataset. The model's performance may be determined by measuring the differences between the model outputs (e.g., predicted query costs) and target outputs (e.g., actual query costs indicated in query plans) on the testing datasets.

Figure 9:
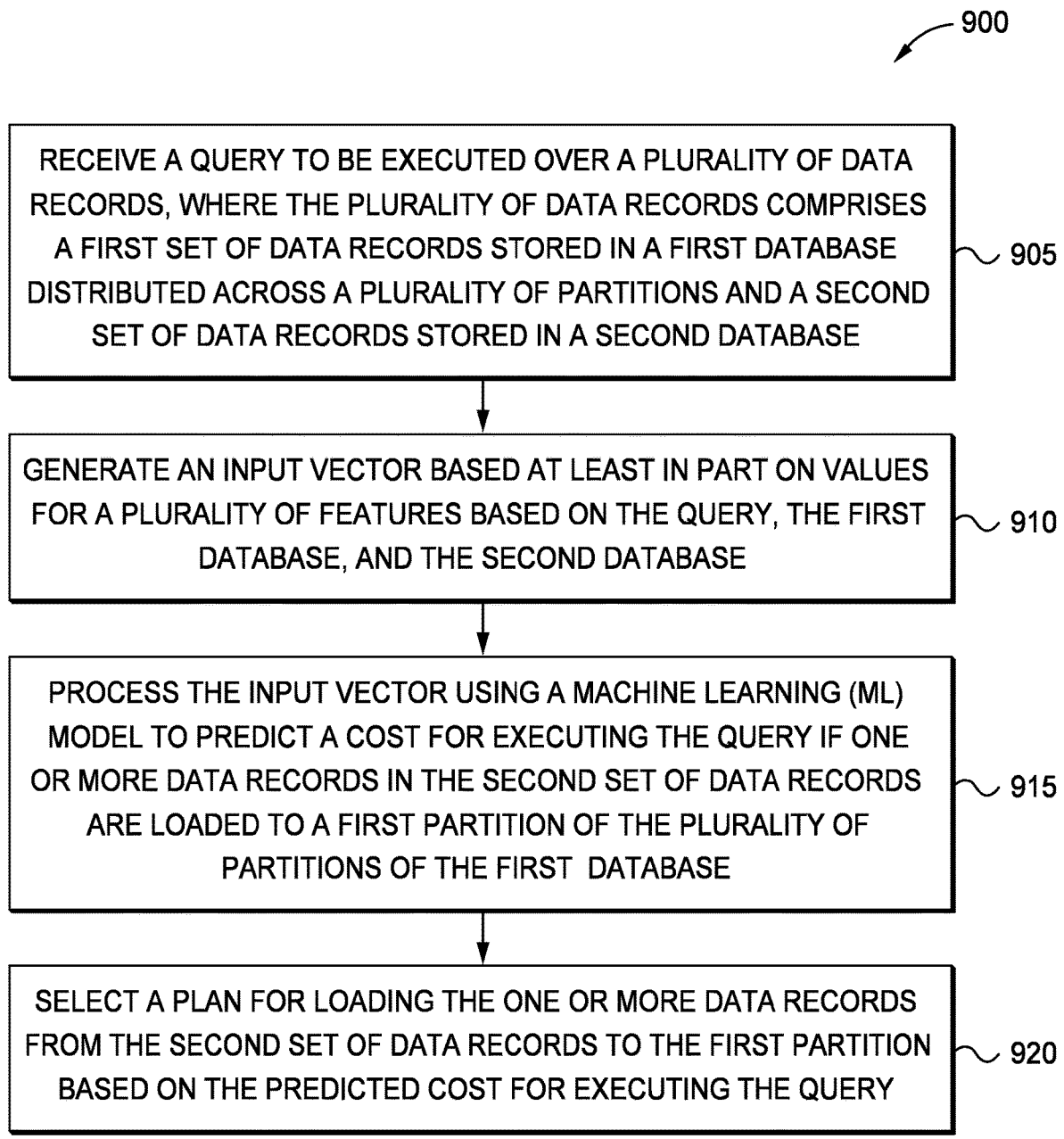
FIG. 9 is a flow diagram depicting an example method for identifying improved data placement plan for related database queries, according to some embodiments of the present disclosure.

FIG. 9 is a flow diagram depicting an example method 900 for identifying improved data placement plan for related database queries, according to some embodiments of the present disclosure.

At block 905, a system (e.g., the database server system 210 of FIG. 2) receives a query (e.g., 505 of FIG. 5) to be executed over a plurality of data records, where the plurality of data records comprises a first set of data records (e.g., 510 of FIG. 5) stored in a first database (e.g., the database storage system 205 of FIG. 3) distributed across a plurality of partitions (e.g., 340A-340C of FIG. 3) and a second set of data records (e.g., 515 of FIG. 5) stored in a second database (e.g., external data repository 275 of FIG. 2). In some embodiments, the query (e.g., 505 of FIG. 5) is received by the system (e.g., the database server system 210 of FIG. 2) from a client system (e.g., 250 of FIG. 2) via a network (e.g., 245 of FIG. 2).

At block 910, the system (e.g., the database server system 210 of FIG. 2) generates an input vector based at least in part on values for a plurality of features based on the query (e.g., 505 of FIG. 5), the first database (e.g., the database storage system 205 of FIG. 2), and the second database (e.g., external data repository 275 of FIG. 2). At block 915, the system (e.g., the database server system 210 of FIG. 2) processes the input vector using a machine learning (ML)

model (e.g., 545 of FIG. 5) to predict a cost for executing the query if one or more data records in the second set of data records (e.g., 515 of FIG. 5) are loaded to a first partition of the plurality of partitions (e.g., 340A-340C of FIG. 3) of the first database (e.g., the database storage system of FIG. 3). In some embodiments, the system may generate a predicted query cost vector (e.g., 555 of FIG. 5) for the query (e.g., 505 of FIG. 5) by processing the input vector, using the ML model (e.g., 545 of FIG. 5). In some embodiments, the predicted query cost vector (e.g., 555 of FIG. 5) may comprise a plurality of predicted query costs, and each perspective predicted query cost of the plurality of predicted query costs correspond to the a respective data partition (e.g., 340A-340C of FIG. 3) to which the one or more data records in the second set of data records (e.g., 515 of FIG. 5) can be loaded during execution of the query (e.g., 505 of FIG. 5).

At block 920, the system (e.g., the database server system 210 of FIG. 2) selects a plan for loading the one or more data records from the second set of data records (e.g., 515 of FIG. 5) to the first partition (e.g., 565 of FIG. 5) based on the predicted cost for executing the query. In some embodiments, the first partition selected (e.g., 565 of FIG. 5) may have the minimum/lowest query cost of the plurality of predicted query costs.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

While the foregoing is directed to embodiments of the present invention, other and further embodiments of the invention may be devised without departing from the basic scope thereof, and the scope thereof is determined by the claims that follow.

What is claimed is:

1. A method comprising:
  receiving a query to be executed over a plurality of data records, wherein the plurality of data records comprises a first set of data records stored in a first database distributed across a plurality of partitions and a second set of data records stored in a second database, wherein the second database comprises a different database architecture from the first database;
  generating an input vector based at least in part on values for a plurality of features based on the query, the first database, and the second database;
  processing the input vector using a machine learning (ML) model to predict a cost for executing the query if one or more data records in the second set of data records are loaded to a first partition of the plurality of partitions of the first database, wherein the ML model is trained to predict the cost of the query, comprising:
    generating one or more output query costs by using a plurality of training features as inputs; and
    adjusting one or more parameters of the ML model to reduce a difference between the one or more output query costs and one or more historical query costs; and
  selecting a plan for loading the one or more data records from the second set of data records to the first partition based on the predicted cost for executing the query.

2. The method of claim 1, further comprising generating a predicted query cost vector for the query by processing the input vector using the ML model.

3. The method of claim 2, wherein:
the predicted query cost vector comprises a plurality of predicted query costs, and
each respective predicted query cost of the plurality of predicted query costs corresponds to a respective data partition to which the one or more data records in the second set of data records can be loaded during execution of the query.

4. The method of claim 3, wherein selecting the plan for loading the one or more data records comprises identifying the first partition having a minimum query cost of the plurality of predicted query costs.

5. The method of claim 1, wherein the plurality of features includes one or more characteristics for the first set of data records, one or more characteristics for the second set of data records, one or more characteristics for the query, one or more characteristics for the plurality of partitions in the first database, and one or more characteristics for the second database.

6. The method of claim 1, wherein the ML model is trained to predict the cost of the query, further comprising:
accessing a plurality of training data records from historical information of the first and second database, wherein the plurality of training data records comprise one or more training queries, and the one or more historical query costs;
extracting the plurality of training features from the plurality of training data records;
evaluating an accuracy of the ML model using one or more evaluation metrics comprising at least one of means square error (MSE), mean absolute error (MAE), or R Squared; and
upon determining that the accuracy satisfies one or more accuracy criteria, deploying the ML model.

7. The method of claim 6, wherein the ML model comprises a neural network model comprising a number of input neurons that is equal to a number of a plurality of training features extracted from the plurality of training data records.

8. The method of claim 6, wherein the plurality of training features extracted from the plurality of training data records, comprises at least one of one or more characteristics for the training data records, one or more characteristics for the training queries, one or more characteristics for the plurality of partitions in the first database, one or more characteristics for the second database.

9. The method of claim 6, wherein training the ML model further comprises:
dividing the plurality of training data records into a set of training model records, a set of validating model records, and a set of testing model records;
training the ML model using the set of training model records;
validating the ML model using the set of validating model records; and
testing the ML model using the set of testing model records to determine if the accuracy of the ML model satisfies the one or more accuracy criteria.

10. The method of claim 1, further comprising selecting the ML model from a plurality of ML models based on an architecture of the second database, wherein each respective ML model of the plurality of ML models was trained based on a respective database architecture.

11. A system comprising:
one or more computer processors; and
one or more memories collectively containing one or more programs which when executed by the one or more computer processors performs an operation, the operation comprising:
receiving a query to be executed over a plurality of data records, wherein the plurality of data records comprises a first set of data records stored in a first database distributed across a plurality of partitions and a second set of data records stored in a second database, wherein the second database comprises a different database architecture from the first database;
generating an input vector based at least in part on values for a plurality of features based on the query, the first database, and the second database;
processing the input vector using a machine learning (ML) model to predict a cost for executing the query if one or more data records in the second set of data records are loaded to a first partition of the plurality of partitions of the first database, wherein the ML model is trained to predict the cost of the query, comprising:
generating one or more output query costs by using a plurality of training features as inputs; and
adjusting one or more parameters of the ML model to reduce a difference between the one or more output query costs and one or more historical query costs; and
selecting a plan for loading the one or more data records from the second set of data records to the first partition based on the predicted cost for executing the query.

12. The system of claim 11, wherein the ML model is trained to predict the cost of the query, further comprising:
accessing a plurality of training data records from historical information of the first and second database, wherein the plurality of training data records comprise one or more training queries, and the one or more historical query costs;
extracting the plurality of training features from the plurality of training data records;
evaluating an accuracy of the ML model using one or more evaluation metrics comprising at least one of means square error (MSE), mean absolute error (MAE), or R Squared; and
upon determining that the accuracy satisfies one or more accuracy criteria, deploying the ML model.

13. The system of claim 11, further comprising selecting the ML model from a plurality of ML models based on an architecture of the second database, wherein each respective ML model of the plurality of ML models was trained based on a respective database architecture.

14. The system of claim 11, further comprising generating a predicted query cost vector for the query by processing the input vector using the ML model, wherein:
the predicted query cost vector comprises a plurality of predicted query costs, and
each respective predicted query cost of the plurality of predicted query costs corresponds to a respective data partition to which the one or more data records in the second set of data records can be loaded during execution of the query.

15. The system of claim 14, wherein selecting the plan for loading the one or more data records comprises identifying the first partition having a minimum query cost of the plurality of predicted query costs.

16. A computer program product comprising one or more computer-readable storage media collectively containing computer-readable program code that, when executed by operation of one or more computer processors, performs an operation comprising:
- receiving a query to be executed over a plurality of data records, wherein the plurality of data records comprises a first set of data records stored in a first database distributed across a plurality of partitions and a second set of data records stored in a second database;
- generating an input vector based at least in part on values for a plurality of features based on the query, the first database, and the second database, wherein the second database comprises a different database architecture from the first database;
- processing the input vector using a machine learning (ML) model to predict a cost for executing the query if one or more data records in the second set of data records are loaded to a first partition of the plurality of partitions of the first database, wherein the ML model is trained to predict the cost of the query, comprising:
  - generating one or more output query costs by using a plurality of training features as inputs; and
  - adjusting one or more parameters of the ML model to reduce a difference between the one or more output query costs and one or more historical query costs; and
- selecting a plan for loading the one or more data records from the second set of data records to the first partition based on the predicted cost for executing the query.

17. The computer program product of claim 16, wherein the ML model is trained to predict the cost of the query, further comprising:
- accessing a plurality of training data records from historical information of the first and second database, wherein the plurality of training data records comprise one or more training queries, and the one or more historical query costs;
- extracting the plurality of training features from the plurality of training data records;
- evaluating an accuracy of the ML model using one or more evaluation metrics comprising at least one of means square error (MSE), mean absolute error (MAE), or R Squared; and
- upon determining that the accuracy satisfies one or more accuracy criteria, deploying the ML model.

18. The computer program product of claim 16, further comprising selecting the ML model from a plurality of ML models based on an architecture of the second database, wherein each respective ML model of the plurality of ML models was trained based on a respective database architecture.

19. The computer program product of claim 16, further comprising generating a predicted query cost vector for the query by processing the input vector using the ML model, wherein:
- the predicted query cost vector comprises a plurality of predicted query costs, and
- each respective predicted query cost of the plurality of predicted query costs corresponds to a respective data partition to which the one or more data records om the second set of data records can be loaded during execution of the query.

20. The computer program product of claim 19, wherein selecting the plan for loading the one or more data records comprises identifying the first partition having a minimum query cost of the plurality of predicted query costs.

21. A method comprising:
- accessing a plurality of training data records from historical information of a first database and a second database, wherein the plurality of training data records comprise one or more training queries, and one or more historical query costs, and wherein the second database comprises a different database architecture from the first database;
- extracting a plurality of training features from the plurality of training data records;
- training a ML model by using the plurality of training features as inputs and the one or more historical query costs as target outputs, comprising:
  - generating one or more output query costs by using the plurality of training features as inputs; and
  - adjusting one or more parameters of the ML model to reduce a difference between the one or more output query costs and the one or more historical query costs; and
- upon determining that accuracy of the ML model satisfies one or more accuracy criteria, deploying the ML model.

22. The method of claim 21, wherein the ML model comprises a neural network model comprising a number of input neurons that is equal to a number of the plurality of training features.

23. The method of claim 21, wherein training the ML model further comprises:
- dividing the plurality of training data records into a set of training model records, a set of validating model records, and a set of testing model records;
- training the ML model using the set of training model records;
- validating the ML model using the set of validating model records; and
- testing the ML model using the set of testing model records to determine if the accuracy of the ML model satisfies the one or more accuracy criteria.

24. The method of claim 21, further comprising:
- receiving a query to be executed over a plurality of data records, wherein the plurality of data records comprises a first set of data records stored in the first database distributed across a plurality of partitions and a second set of data records stored in the second database;
- generating an input vector based at least in part on values for a plurality of features based on the query, the first database, and the second database;
- processing the input vector using the ML model to predict a cost for executing the query if one or more data records in the second set of data records are loaded to a first partition of the plurality of partitions of the first database; and
- selecting a plan for loading the one or more data records from the second set of data records to the first partition based on the predicted cost for executing the query.

25. A system comprising:
one or more computer processors; and
one or more memories collectively containing one or more programs which when executed by the one or more computer processors performs an operation, the operation comprising:
- assessing a plurality of training data records from historical information of a first database and a second database, wherein the plurality of training data records comprise one or more training queries, and one or more historical query costs, and wherein the second database comprises a different database architecture from the first database;

extracting a plurality of training features from the plurality of training data records;

training a ML model by using the plurality of training features as inputs and the one or more historical query costs as target outputs, comprising:
    generating one or more output query costs by using the plurality of training features as inputs; and
    adjusting one or more parameters of the ML model to reduce a difference between the one or more output query costs and the one or more historical query costs; and upon determining that accuracy of the ML model satisfies one or more accuracy criteria, deploying the ML model;

using the ML model to predict a cost for executing a query, wherein:
    the query is to be executed over a plurality of data records, and
    the plurality of data records comprises a first set of data records stored in the first database distributed across a plurality of partitions and a second set of data records stored in the second database; and selecting a plan for loading the second set of data records to a first partition of the plurality of partitions in the first database based on the predicted cost for executing the query.

* * * * *